(12) United States Patent
Lake

(10) Patent No.: US 11,863,384 B2
(45) Date of Patent: *Jan. 2, 2024

(54) AUTOMATIC DERIVATION OF REPOSITORY ACCESS DATA BASED ON SYMBOLIC CONFIGURATION

(71) Applicant: Palantir Technologies Inc., Denver, CO (US)

(72) Inventor: Alexander Lake, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,154

(22) Filed: Jan. 4, 2023

(65) Prior Publication Data
US 2023/0145890 A1    May 11, 2023

Related U.S. Application Data

(63) Continuation of application No. 16/258,413, filed on Jan. 25, 2019, now Pat. No. 11,552,847.
(Continued)

(51) Int. Cl.
*G06F 9/44* (2018.01)
*G06F 21/60* (2013.01)
(Continued)

(52) U.S. Cl.
CPC .......... *H04L 41/0816* (2013.01); *G06F 3/067* (2013.01); *G06F 3/0622* (2013.01);
(Continued)

(58) Field of Classification Search
CPC .... G06F 16/958; G06F 21/31; G06F 21/6227; H04L 63/08; H04L 61/10; H04L 63/102; H04L 63/104; H03M 13/05
See application file for complete search history.

(56) References Cited

U.S. PATENT DOCUMENTS 6,854,009 B1   2/2005  Hughes
10,616,235 B2 *  4/2020  Alon .................. H04L 63/104
(Continued)

OTHER PUBLICATIONS

Github, 2023, Adding outisde collaborators to repositories in your organization, https://docs.github.com/en/enterprise-cloud@latest/organizations/managing-user-access-to-your-organizations-repositories/managing-outside-collaborators/adding-outside-collaborators-to-repositories-in-your-organization, (Year: 2023).*

*Primary Examiner* — Nicholas R Taylor
*Assistant Examiner* — Ho T Shiu
(74) *Attorney, Agent, or Firm* — Duane Morris LLP

(57) ABSTRACT

A method comprises storing an electronic configuration document that identifies configurations of users, groups, and/or permissions relating to access to computer program artifacts in a first repository of an artifact repository system that is geographically distributed. The users and groups include external user groups who do not have explicit user-based permissions to view contents of a repository of the artifact repository system. The artifact repository system comprise second repositories that respectively replicate third repositories and have associated sets of properties, the third repositories including a repository external to the artifact repository system and associated with an external user group. The configurations comprise at least one configuration for configuring external visibility of computer program artifacts for one or more external user groups. The method further comprises deriving from the electronic configuration document, a plurality of regional repository settings values for each second repository based on the associated set of properties.

20 Claims, 4 Drawing Sheets

Related U.S. Application Data

(60) Provisional application No. 62/671,951, filed on May 15, 2018.

(51) Int. Cl.
*H04L 41/0816* (2022.01)
*H04L 41/0893* (2022.01)
*H04L 41/08* (2022.01)
*G06F 3/06* (2006.01)
*G06F 16/17* (2019.01)
*G06F 8/71* (2018.01)
*G06F 16/182* (2019.01)

(52) U.S. Cl.
CPC .............. *G06F 3/0637* (2013.01); *G06F 8/71* (2013.01); *G06F 16/1734* (2019.01); *G06F 16/184* (2019.01); *H04L 41/0886* (2013.01); *H04L 41/0893* (2013.01)

(56) References Cited

U.S. PATENT DOCUMENTS

| | | | |
|---|---|---|---|
| 2003/0225764 A1 | 12/2003 | Smith et al. | |
| 2006/0080278 A1* | 4/2006 | Neiditsch | H04L 51/00 |
| 2009/0216990 A1 | 8/2009 | Vick et al. | |
| 2009/0271584 A1* | 10/2009 | Toda | G06F 21/78 |
| | | | 711/E12.091 |
| 2013/0254755 A1* | 9/2013 | Yousouf | G06F 8/60 |
| | | | 717/170 |
| 2014/0115003 A1* | 4/2014 | Paymal | G06F 21/6227 |
| | | | 707/784 |
| 2016/0259556 A1* | 9/2016 | Manabe | G06F 3/0613 |
| 2016/0358117 A1 | 12/2016 | Herrin et al. | |
| 2017/0289171 A1* | 10/2017 | Resch | H04L 63/108 |
| 2017/0346862 A1* | 11/2017 | Hanhirova | H04L 63/08 |

* cited by examiner

AUTOMATIC DERIVATION OF REPOSITORY ACCESS DATA BASED ON SYMBOLIC CONFIGURATION

BENEFIT CLAIM

This application claims the benefit under 35 U.S.C. § 120 as a Continuation of application Ser. No. 16/258,413, filed Jan. 25, 2019, which claims the benefit under 35 U.S.C. § 119(e) of provisional application 62/671,951, filed May 15, 2018, the entire contents of which are hereby incorporated by reference as if fully set forth herein. Applicant hereby rescinds any disclaimer of claim scope in the parent applications or the prosecution history thereof and advises the USPTO that the claims in this application may be broader than any claims in the parent applications.

TECHNICAL FIELD

One technical field of the present disclosure is distributed data storage systems useful for storing and distributing copies of computer program executables, installers and other artifacts. Another technical field is configuration of clusters of data storage repositories. Yet another technical field is establishing repository configuration settings for the configuration of geographically distributed clusters of data storage repositories.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The professional software development ecosystem now includes source code version control systems, build tools, continuous integration (CI) managers, binary repositories, containerization tools and deployment tools. Development of complex software involves creating executables and installers, often organized as distributions, and sometimes termed "artifacts" in relation to the computer program source code from which they are derived. Binary repositories have become the preferred management tool for artifacts; JFrog Artifactory is a commercial example.

Executables and installers are frequently downloaded by large numbers of end users. For example, the executable version of a popular computer program application could be downloaded millions of times by computers located around the world. Therefore, artifact storage may be organized as a geographically distributed datastore having multiple regional mirror sites or clusters. With such a system, consistent management and deployment of file permissions, groups, and user credentials is a recurring problem. Changes to permissions or group membership in one cluster need to be propagated to all other clusters in an efficient manner, but current approaches use manual entry of these details.

Furthermore, artifact storage may be organized in internal and external deployments that are intended for user groups inside and outside an enterprise, respectively. Internal repositories mirror other internal repositories and external repositories may mirror third-party external sources. Requests directed to external artifact storage are proxied and subject to visibility constraints based upon contract terms applying to deployments. Thus, the division of internal and external deployments adds a layer of complexity that requires correct resolution.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
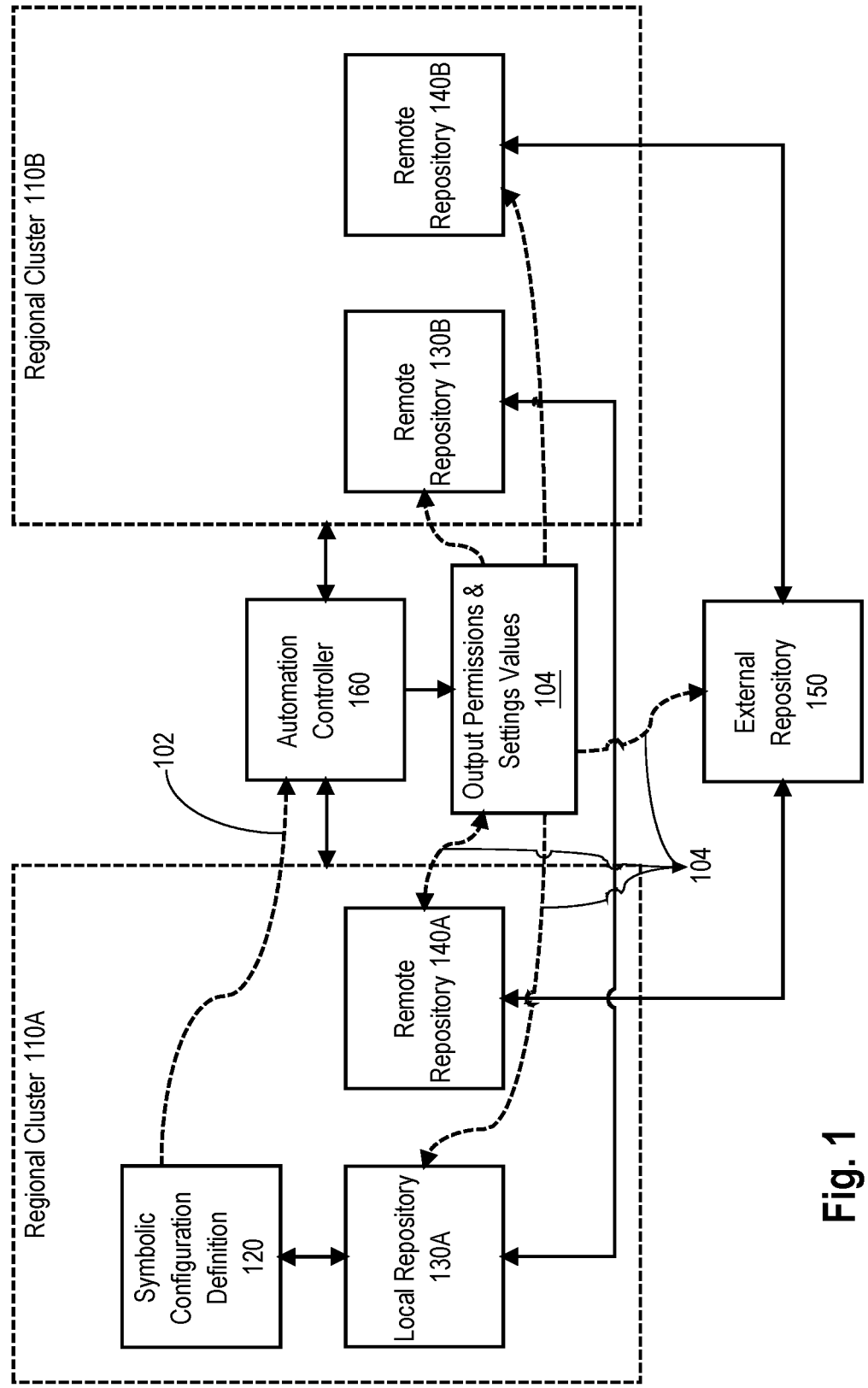
FIG. 1 is an example of an automation system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
   2.1 ARTIFACT REPOSITORY
   2.2 REGIONAL CLUSTERS
   2.3 CONFIGURATION FILE
   2.4 AUTOMATION CONTROLLER
      2.4.1 DETECTING CHANGES TO A CONFIGURATION FILE
      2.4.2 DERIVATION OF COMMANDS AND PARAMETERS
      2.4.3 PROPAGATING COMMANDS AND PARAMETERS
3.0 EXAMPLE PROCESS AND ALGORITHM
4.0 IMPLEMENTATION MECHANISMS— HARDWARE OVERVIEW
5.0 IMPLEMENTATION MECHANISMS— SOFTWARE OVERVIEW
6.0 OTHER ASPECTS OF DISCLOSURE

1.0 GENERAL OVERVIEW

A binary artifact repository comprises a geographically distributed datastore. An automation system implements infrastructure as code, in which markup language configuration files authoritatively and symbolically define permissions and credentials that are to be deployed for specified artifacts, projects or products across all local or remote repositories in local storage or in regional mirrors of the artifact repository system. Each configuration file does not need to define region-specific attributes, as the automation system can derive regional differences based on a more generic configuration. Furthermore, configuration files do not need to explicitly define permissions or other settings in the same terms as used in the artifact repository; instead, the automation system transforms markup code in the configuration file into the specific command(s) and/or parameter value(s) that need to be written into the artifact repository to accomplish the functional result specified in the configuration file. The automation system performs checks on the configuration files, then executes inferential transformations prior to deploying the configuration on each cluster. Derivations are performed to determine what artifacts are visible in an internal repository as compared to an external repository. For example, if a new local repository is created in a particular regional cluster, then in response, the automation system will create a remote repository with the same name in other regional clusters that refers back to the local repository for configuration. Similarly, any change in a particular local repository causes the automation system to immediately transmit equivalent changes to all other corresponding repos in all other regional clusters. A single configuration file for the new local repository defines configuration for that repository that is to be used to derive all settings for corresponding repos in all other regional clusters.

Operation of the automation system is triggered when a change, reflected for example in a Github pull request, is merged following approval. Embodiments manage creating, updating and deleting users, groups and permissions for any repo, as well as configuring external visibility of artifacts. For example, embodiments can create users and permissions, derive settings for regional mirrors, inject credentials into a CI system if needed, and establish visibility settings as needed. These operations can be executed serially or in parallel based on using a dependency graph.

Embodiments also receive requests from external deployments, proxy the requests, authenticate credentials, and moderate the requests so that visibility of artifacts is provided only to authorized external deployments based on permissions specified in the configuration files. Embodiments also are capable of defining multiple separate but associated YAML files that collectively provide a complete configuration, and the automation system will marshal and process them collectively; this facilitates more efficient data storage and management of very large configuration files.

In an embodiment, a data processing method comprises detecting an approval of a change to an electronic configuration document that symbolically identifies one or more configurations of users, groups, and/or permissions relating to access to computer program artifacts that are stored in a first repository of a geographically distributed, replicated artifact repository system; the artifact repository system comprising one or more second repositories that are geographically remote with respect to the first repository and which replicate the first repository; in response to the detecting: obtaining the electronic configuration document and deriving, based on the electronic configuration document, a plurality of regional repository settings values for users, groups, and/or permissions relating to access to the computer program artifacts and for the one or more second repositories; transmitting the one or more settings values to the one or more second repositories and causing injection of the one or more settings values into one or more repository configuration settings of the second repositories;

Thus, an automated software system implements infrastructure as code, in which markup language configuration files authoritatively and symbolically define permissions and credentials that are to be deployed for specified artifacts, projects or products across all local or remote repositories in local storage or in regional mirrors of the artifact repository system. Each configuration file does not need to define region-specific attributes, as the automation system can derive regional differences based on a more generic configuration. Furthermore, configuration files do not need to explicitly define permissions or other settings in the same terms as used in the artifact repository; instead, the automation system transforms markup code in the configuration file into the specific command(s) and/or parameter value(s) that need to be written into the artifact repository to accomplish the functional result specified in the configuration file. The automation system performs checks on the configuration files, then executes inferential transformations prior to deploying the configuration on each cluster.

2.0 EXAMPLE COMPUTER SYSTEM IMPLEMENTATION

FIG. 1 illustrates an example automation system in which the techniques described herein may be practiced, according to some embodiments.

In the example of FIG. 1, an automation system 100 comprises a replicated artifact repository system that is programmed or configured to provide automated configuration and deployment of artifact repositories across clusters using one or more configuration file(s). Automation system 100 may be implemented across one or more physical or virtual computing devices, none of which is intended as a generic computer, since it is loaded with instructions in a new ordered combination as otherwise disclosed herein to implement the functions and algorithms of this disclosure.

The example components of automation system 100 in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Automation system 100 illustrates only one of many possible arrangements of components configured to execute the programming described herein. Other arrangements may include fewer or different components, and the division of work between the components may vary depending on the arrangement.

2.1 Artifact Repository

Automation system 100 includes a plurality of artifact repositories 130A, 130B, 140A, 140B, and/or 150. In different embodiments, a different number of repositories and/or different types of repositories may be included or excluded, thus, automation system 100 is only intended to illustrate the concepts of how the such a system may be configured in one embodiment. An artifact repository is a datastore that may be used to manage, store, and/or retrieve software artifacts and metadata concerning those software artifacts. In an embodiment, the repository may store artifacts and metadata in a defined directory structure. In an embodiment, an artifact repository may include version control of the versions of software artifacts stored in it. A software artifact is any binary data used in a software development process. Examples of software artifacts may include, but are not limited to, executables, installers, JAR files, libraries, application binaries, archives, or any other similar binary data. A software artifact may be added to an artifact repository as part of a product release, as part of a scheduled product build, and/or manually by users with access to the artifact repository.

A local repository, such as local repository 130A, is an example of a type of artifact repository. A local repository is a private or internal artifact repository that may act as a source of truth. For example, local repository 130A may be used by a private enterprise for a private software development project. A local repository 130A may serve as a source of truth, as any modifications to the contents of the local repository 130A would be propagated to mirrors of the repository. Since a local repository is a private artifact repository, it may be necessary to configure user access permissions to the contents of the local repository and its mirrors so that only those users with appropriate permissions can access the contents of such a repository.

An external repository, such as external repository 150, is an example of a type of artifact repository. An external repository is a public or third-party artifact repository that may act as a source of truth. For example, external repository 150 may be owned and/or operated by a third-party and may provide open source or publicly available software libraries or packages. An external repository 150 may serve as a source of truth, as any modifications to the contents of the external repository 150 would be propagated to mirrors.

A remote repository, such as remote repositories 140A, 140B, and/or 130B, is an example of a type of artifact repository. A remote repository is replicated mirror of another artifact repository. A remote repository may be a replicated mirror of either a local repository or an external repository. For example, remote repository 130B is a replicated mirror of local repository 130A. However, remote repository 140A and 140B are replicated mirrors of external repository 150.

2.2 Regional Clusters

Automation system 100 includes a plurality of regional clusters 110. A regional cluster 110 is a grouping of one or more artifact repositories that can be used to serve a particular geographic location or region. In the example of automation system 100, two regional clusters 110A and 110B are depicted, however, in other embodiments, a different number of regional clusters 110 may exist. Contents of the repositories may be mirrored and replicated to other regional clusters. Likewise, as will be described, configurations of users, groups, and/or permissions for each regional cluster 110 may be implemented by an automation controller 160. Thus, if a user needs access to data stored in a particular repository, the data may be accessed in the mirror of the repository in the nearest regional cluster 110, thereby providing improvements to system performance and requests, rather than having to access that data in a regional cluster 110 that is geographically far from the user's physical location.

To illustrate, for example, regional cluster 110A may be a cluster located in North America and regional cluster 110B may be located in Australia. Regional cluster 110A may include a local repository 130A and a remote repository 140A. Local repository 130A is an internal and/or private artifact repository. Remote repository 140A is a replicated mirror of external repository 150. Access to the repositories of regional cluster 110A may include configuration of users, groups, and/or permissions. The configuration of users, groups, and/or permissions may be defined, at lest in part, in a symbolic configuration definition 120 associated with a particular repository. Further details regarding the contents of such a configuration definition 120 will be described herein.

The contents of the repositories of regional cluster 110A, as well as the configurations of users, groups, and/or permissions, may be replicated to regional cluster 110B. Regional cluster 110B includes remote repository 130B, which is a replicated mirror of local repository 130A. Regional cluster 110B includes remote repository 140B, which is a replicated mirror of external repository 150. The configuration of regional cluster 110B, including, but not limited to users, groups, and permissions, may be orchestrated by automation controller 160 based on the contents of configuration definition 120, as will be described herein.

Thus, software developer that is located in Australia that requires an artifact in a repository can access that artifact from regional cluster 110B instead of regional cluster 110A, because the artifact has been mirrored to regional cluster 110B and the software developer will have the appropriate permissions to access it from regional cluster 110B. By replicating the contents of regional clusters 110 to different regions, automation system 100 ensures that systems in different geographic locations have nearby access to the contents of the repositories using appropriate permissions, thereby improving repository connectivity, lag, and network access.

2.4 Symbolic Configuration Definition

A configuration definition 120 is an electronic configuration document that may comprise a file or set of files symbolically specifying instructions, parameters, settings, and/or configurations of users, groups, and/or permissions relating to access to artifacts that are stored in one or more repositories of automation system 100. In one embodiment, a configuration definition 120 may be implemented in any markup language or data format syntax, such as extensible markup language (XML), "YAML Ain't Markup Language" (YAML), or JavaScript Object Notation (JSON), and is stored in the form of digital data in a storage device or digital memory. In an embodiment, a configuration definition 120 may be associated with a particular repository, however, in another embodiment, a configuration definition 120 may be associated with a plurality of repositories. In the example of automation system 100, configuration definition 120 defines the instructions, parameters, settings, and/or configurations of users, groups, and/or permissions relating to access to artifacts in local repository 130A. In other embodiments, electronic configuration documents may be functionally equivalent to the configuration definition 120 described herein but expressed in XML, HTML, conventional programming source code languages, other human-readable symbolic languages or natural language.

A user can provide custom details in a configuration definition 120 to customize the users, groups, and/or permissions relating to access to artifacts in a repository. The configuration definition 120 thereby authoritatively and symbolically defines permissions and credentials that are to be deployed for specified artifacts, projects or products across all local or remote repositories in local storage or in regional mirrors of the system. Each configuration definition 120 does not need to define region-specific attributes, as the automation controller 160 can derive regional differences based on a more generic configuration. Furthermore, a configuration definition 120 does not need to explicitly define permissions or other settings in the same terms as used in the artifact repository; instead, the configuration definition 120 may define such permissions in a markup code that may be interpreted and transformed by the automation controller 160.

In one embodiment, to invoke execution of automation controller 160, a pull request is opened against a specified repository with proposed changes to a configuration file. For example, a file named "product-publish.yml" is created in a repository for a particular product. Within the file, a <defaults> block is created having the example form of TABLE 1.

TABLE 1

EXAMPLE defaults BLOCK

```
defaults:
    users:
        manage_password: true
        circle_projects: [ ]
        password: null
        groups: [readers, sandbox]
    permissions:
        principals: [ ]
        group_principals: [ ]
```

Next, the name of a publish user is specified; permissions will be attached to this user as principal. It is also possible to associate a set of CI projects with the user. TABLE 2 shows an example:

TABLE 2

EXAMPLE USER DEFINITION

```
users:
    - name: product-publish
      email: product@domain.com
      ci_projects:
          - "system/product"
          - "system/product-app"
          - "system/product-lib"
```

In an embodiment, a next section of the configuration file associates permissions with users. Permissions define which repositories and sub paths the user can publish to. Public locations typically are unique among users. Table 3 illustrates an example block of permissions for a configuration definition 120, according to one embodiment, however, the formant, syntax, tags, or other features of such a configuration definition 120 may vary in different embodiments.

TABLE 3

```
name: Publish - Product
    repositories: [internal-dist-release, internal-
jar-release]
        whitelist: "com/domain/product/**"
        blacklist: ""
        principals:
            - first_example_user: [d, w, n, r]
            - second_example_user: [w, r]
        external-visibility:
            groups: [external-default]
```

In an embodiment, configuration definition 120 may identify one or more repositories for which a block of permissions defined in the configuration file applies to. In the example of Table 3, the "repositories" tag indicates that the block of permissions applies to the two repositories "internal-dist-release" and "internal-jar-release".

In an embodiment, configuration definition 120 may define a whitelist and/or a blacklist that define the paths or subpaths of the repositories for which a block of permissions applies to. In the example of Table 3, the path "com/domain/product/**" is defined as a whitelist path with the "whitelist" tag, therefore, the subsequently defined permissions apply to that particular path on the previously defined repositories "internal-dist-release" and "internal-jar-release". Likewise, in the example of Table A, the "blacklist" tag indicates that no particular paths are blacklisted for the previously defined repositories "internal-dist-release" and "internal-jar-release".

In an embodiment, configuration definition 120 may define user-specific permissions for the repositories. For example, in Table A, the "principals" tag defines a set of user-specific permissions for "first_example_user" and "second_example_user". The permissions include "d" which corresponds to delete permissions, "w" which corresponds to write permissions, "n" which corresponds to annotate permissions, and "r" which corresponds to read permission. This sample list of permissions is merely illustrative, and in other embodiments, additional permission types may be included.

In an embodiment, configuration definition 120 may define group-specific external visibility settings for the repositories that allows groups of users to have read access to newly published or modified artifacts in the repository. In the example of Table 3, the "external-visibility" setting indicates that users that are part of the "external-default" group should have visibility to newly published or modified artifacts in the repositories. External visibility refers to the ability of users or groups of users who do not have explicit user-based permissions to view the contents of a repository.

2.4 Automation Controller

Automation system 100 includes an automation controller 160 that is programmed or configured to detect changes to one or more configuration definitions 120, derive, from the configuration definition 120, specific command(s) and/or parameter(s) that need to be written into an artifact repository to achieve the functional result specified in the configuration definition 120, and deploy the derived configuration on each regional cluster 110. As line 102 indicates, the automation controller 160 may receive input in the form of a configuration definition 120 of regional cluster 110A. Automation controller 160 is programmed to transform the configuration definition into specific commands, parameters or other configuration values in the form of output permissions and settings values 104. As indicated by line 104, automation controller 160 is further programmed to transmit, install or inject the settings values to any local repository, remote repository or external repository as appropriate.

Thus, automation controller 160 is programmed or configured to assist in ensuring that the configuration of deployment of repositories is correctly and accurately replicated to all regional clusters based on the configuration file, including the necessary configurations for users, groups, and/or permissions. Automation controller 160 provides various improvements to the replication of clusters of artifact repositories, including, but not limited to, ensuring the appropriate configuration of repositories in every regional cluster based on the details provided in one or more configuration definition 120, such that each regional cluster appears the same from the perspective of users or groups of users accessing any given regional cluster. Further details on the automation controller 160 will be provided herein.

2.4.1 Detecting Changes to Configuration File

Automation controller 160 is programmed or configured to detect changes made to a configuration definition 120. In other embodiments, the contents of a configuration definition 120 may be implemented in a plurality of individual files, thus, the present techniques may be adapted to detect changes to any individual file. In one embodiment, automation controller 160 may detect when any modification, update, or deletion that has been made to the contents of configuration definition 120. In another embodiment, a change to a configuration definition 120 may be detected only when a modification to the configuration definition 120 has been committed, such as via a Github pull request, to a repository in which the configuration definition 120 is stored (not depicted in FIG. 100). In this example, the change may be detected only once the committed change to the configuration definition 120 has been merged and approved by an appropriate entity with permission to modify the configuration definition 120, such as an administrator.

In some embodiments, detection of a change to a configuration definition 120 may cause automation controller 160 to trigger operations to derive appropriate commands and/or parameter values for the configuration of each regional cluster 110, and propagation of such commands and/or parameter values to other regional clusters, as will be described herein.

2.4.2 Derivation of Commands and Parameters

Configuration definition 120 includes markup language that authoritatively and symbolically defines permissions and credentials that are to be deployed for specified artifacts, projects or products across all local or remote repositories in local storage or in regional mirrors of the artifact repository system. Upon detecting a change to a configuration definition 120, automation controller 160 may be programmed or configured to ingest the contents of the configuration definition 120 and use the content of the configuration definition 120 to transform the markup code of the configuration definition 120 into specific command(s) and/or parameter value(s) that need to be written into the artifact repository to accomplish the functional result specified in the configuration file. The result of this operation is that the automation controller 160 will derive a set of commands and/or parameter values(s) for the configuration of each regional cluster, so that they conform to the functional result specified in configuration definition 120.

During this derivation process, automation controller 160 may be programmed or configured to perform various steps to derive the appropriate command(s) and parameter value(s) for configuration of the regional cluster(s). For example, in one embodiment, embodiment, automation controller 160 may be programmed or configured to check and/or validate the contents of the configuration definition 120. If automation controller 160 detects a validation error, such as improper syntax or some other failure in parsing the configuration definition 120, automation controller 160 may generate an error warning to indicate the validation error.

Additionally, during the derivation process, automation controller 160 is programmed or configured to execute inferential transformations that derive, based on the configuration definition 120, various settings for a regional cluster, including, but not limited to: which repositories should exist, whether a repository is a local repository, whether a repository is a remote repository of another local repository in another regional cluster, whether a repository is a remote repository of an external repository, the users and/or groups with access to each repository, the types of access permissions for each users and groups, including, but not limited to particular artifacts, or repository paths that are visible or not visible to the users and groups, and any other configuration setting the is included in the configuration definition 120. Based on the configuration specified in the configuration definition 120, automation controller 160 can thus derive and determine the topology of permissions for an existing regional cluster and how that regional cluster should be mirrored to another regional cluster.

For example, derivations are performed to determine what artifacts are visible in a local repository 130A as compared to remote repository 140A. If a new local repository 130A is created in a particular regional cluster 110A, then in response, the automation controller 160 will create a remote repository 130B with the same name in other regional clusters, such as regional cluster 110B that refers back to the local repository 130A for configuration. Similarly, any change in a particular local repository 130A causes the automation system to immediately transmit equivalent changes to all other corresponding remote repositories in all other regional clusters. Thus, a single configuration file for the new local repository 130A defines configuration for that repository that is to be used to derive all settings for corresponding repositories in all other regional clusters, such as remote repository 130B in regional cluster 110B. The settings include repository-specific settings, user settings, group settings, and any other similar settings as described above with reference to configuration definition 120.

The output of the derivation process is a set of commands and parameter values for the configuration of a separate regional cluster that conforms to the functional result defined in the configuration definition 120.

2.4.3 Propagating Commands and Parameters

Once the set of commands and parameter values have been derived by the automation controller 160 from the configuration definition 120, automation controller 160 is programmed or configured to propagate and deploy these commands and parameter values to all other regional clusters so that they conform to the settings of the configuration definition 120. For example, the commands and parameter values may include commands and parameter values for managing, creating, updating, and deleting users, groups and permissions for any repository, as well as configuring external visibility of artifacts. The commands and parameter values can, in some embodiments, create users and permissions, inject credentials into a CI system if needed, and establish visibility settings as needed. Automation controller 160 can execute these operations in other regional clusters, such as regional cluster 110B either serially or in parallel based on using a dependency graph.

The result of the propagation of commands and parameters, is that each regional cluster 110B is configured using the configuration definition 120 and includes appropriate replicated mirrors, as well as permissions for users and groups so that a software developer can seamlessly interact to a local regional cluster the same way that they would have been able to interact with any other regional cluster, as all appropriate repository contents, and permission settings have been appropriately mirrored to all regional clusters.

3.0 EXAMPLE PROCESS AND ALGORITHM

Figure 2:
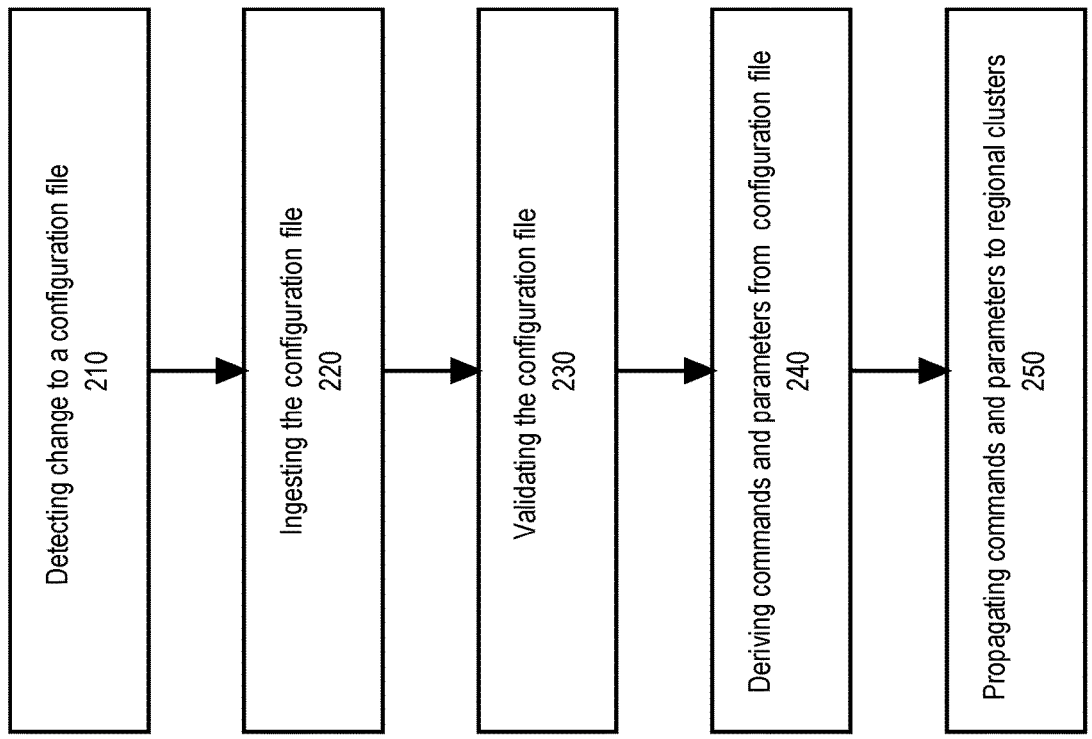
FIG. 2 is a flow diagram of an example process for performing automated configuration and replication of repositories, according to one embodiment.

FIG. 2 illustrates a flow diagram of an example process for performing automated configuration and replication of repositories.

For purposes of illustrating a clear example, process 200 of FIG. 2 is described based on using automation system 100, but other embodiments may use systems other than FIG. 1. FIG. 2 is intended to disclose algorithms or functional descriptions that may be used as a basis of writing computer programs to implement the functions that are described herein, and which cause a computer to operate in the new manner that is disclosed herein. Further, FIG. 2 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 200 may be performed in any order, and is not limited to the order shown in FIG. 2.

In general, process 200 provides for detecting an approval of a change to an electronic configuration document that symbolically identifies one or more configurations of users, groups, and/or permissions relating to access to computer program artifacts that are stored in a first repository of a geographically distributed, replicated artifact repository system, the artifact repository system comprising one or more second repositories that are geographically remote with respect to the first repository and which replicate the first repository; in response to the detecting: obtaining the electronic configuration document and deriving, based on the electronic configuration document, a plurality of regional repository settings values for users, groups, and/or permissions relating to access to the computer program artifacts and for the one or more second repositories; and transmitting the one or more settings values to the one or more second repositories and causing injection of the one or more settings values into one or more repository configuration settings of the second repositories.

The process 200 may begin in step 210. In step 210, automation controller 160 is programmed or configured to detect changes to one or more configuration file(s) 120. In an embodiment, automation controller 160 may detect any newly created configuration file, modified configuration file, and/or deletion of a configuration. In one embodiment, automation controller 160 will only detect a change to one or more configuration files if the changes have been approved and/or committed in a repository, such as by a Git hub pull request that requires user approval. Once automation controller 160 detects a change to one or more configuration file(s) 120, the process 200 may proceed to step 220.

In step 220, automation controller 160 is programmed or configured to ingest the one or more configuration file(s). During this step automation controller 160 may parse the configuration definition 120. In an embodiment, automation controller 106 may be programmed or configured to parse configuration settings from multiple separate, but associated configuration file(s) 120 that collectively provide a complete configuration. The automation controller 160 may marshal and process the separate configuration file(s) 120 and process them collectively, thereby facilitating more efficient data storage and management of very large configuration files. The process 200 may then proceed to step 230.

In step 230, automation controller 160 may optionally be programmed or configured to validate the configuration file(s) 120 ingested in the previous step. Validation may include validating the syntax of the configuration file(s), validating the values of the configuration settings in the configuration file(s) and/or any other check or validation on the contents or structure of the configuration file(s). If automation controller 160 detects a validation error, such as improper syntax or some other failure in parsing the configuration definition 120, automation controller 160 may generate an error warning to notify an administrator about the validation error. In an embodiment, detection of a validation error may cause the automation controller 160 to end process 200, to allow time for the administrator to correct the cause of the validation error. The process 200 may then proceed to step 240.

In step 240, automation controller 160 is programmed or configured to derive a set of commands and/or parameters for the configuration of one or more regional clusters based on the contents of the configuration file(s) 120. During this derivation process, automation controller 160 is programmed or configured to execute inferential transformations that derive, based on the configuration definition 120, various configuration commands and configuration parameters for a regional cluster, including, but not limited to: which repositories should exist, whether a repository is a local repository, whether a repository is a remote repository of another local repository in another regional cluster, whether a repository is a remote repository of an external repository, the users and/or groups with access to each repository, the types of access permissions for each users and groups, including, but not limited to particular artifacts, or repository paths that are visible or not visible to the users and groups, and any other configuration setting the is included in the configuration definition 120. Based on the configuration specified in the configuration definition 120, automation controller 160 can thus automatically derive and determine the topology of permissions for an existing regional cluster and how that regional cluster should be mirrored to another regional cluster. The output of the derivation process is a set of commands and parameter values for the configuration of a separate regional cluster that conforms to the functional result defined in the configuration definition 120. The process 200 may then proceed to step 250.

In step 250, automation controller 160 is programmed or configured to propagate and/or apply the commands and/or parameter values derived in step 240, to one or more regional clusters in order to configure the one or more regional clusters based on the configuration file(s). The commands and parameter values can include commands and parameter values for managing, creating, updating, and deleting users, groups and permissions for any repository, as well as configuring external visibility of artifacts. The commands and parameter values can, in some embodiments be used by automation controller 160 to create users and permissions, inject credentials into a CI system if needed, and establish external visibility settings as needed. Automation controller 160 can execute these operations in other regional clusters, such as regional cluster 110B either serially or in parallel based on using a dependency graph. The result of the propagation of commands and parameters, is that each regional cluster 110B is configured using the configuration definition 120 and includes appropriate replicated mirrors of repositories. The process 200 may then end.

4.0 IMPLEMENTATION MECHANISMS—HARDWARE OVERVIEW

Figure 3:
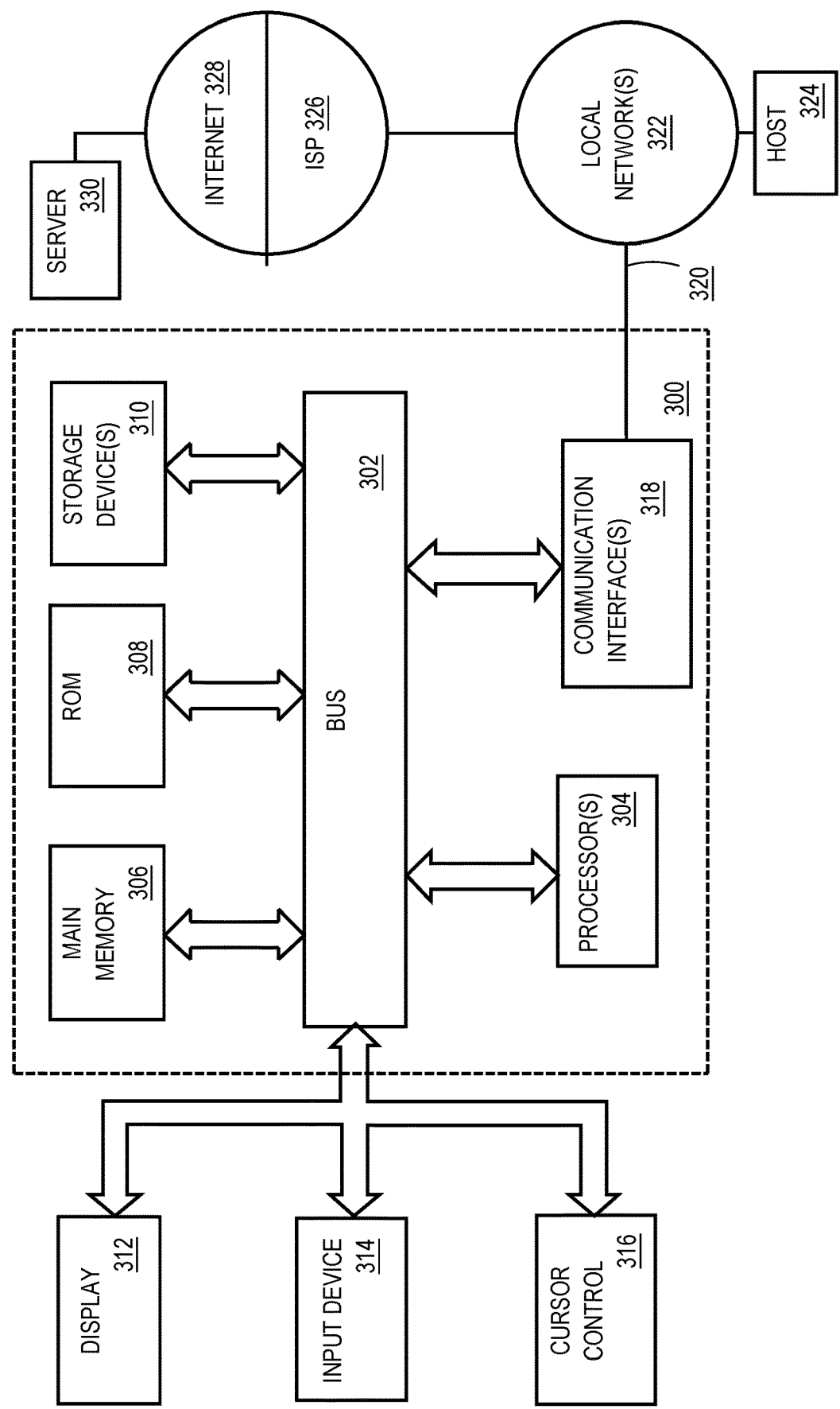
FIG. 3 is a block diagram of a computing device in which the example embodiment(s) of the present invention may be embodied.

Referring now to FIG. 3, it is a block diagram that illustrates a computing device 300 in which the example embodiment(s) of the present invention may be embodied. Computing device 300 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 300 may include a bus 302 or other communication mechanism for addressing main memory 306 and for transferring data between and among the various components of device 300.

Computing device 300 may also include one or more hardware processors 304 coupled with bus 302 for processing information. A hardware processor 304 may be a general purpose microprocessor, a system on a chip (SoC), or other processor.

Main memory 306, such as a random access memory (RAM) or other dynamic storage device, also may be coupled to bus 302 for storing information and software instructions to be executed by processor(s) 304. Main memory 306 also may be used for storing temporary variables or other intermediate information during execution of software instructions to be executed by processor(s) 304.

Software instructions, when stored in storage media accessible to processor(s) 304, render computing device 300 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 300 also may include read only memory (ROM) 308 or other static storage device coupled to bus 302 for storing static information and software instructions for processor(s) 304.

One or more mass storage devices 310 may be coupled to bus 302 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 310 (e.g., the main hard disk for the device) stores a body of program and data for directing operation of the computing device, including an operating system, user application programs, driver and other support files, as well as other data files of all sorts.

Computing device 300 may be coupled via bus 302 to display 312, such as a liquid crystal display (LCD) or other electronic visual display, for displaying information to a computer user. In some configurations, a touch sensitive surface incorporating touch detection technology (e.g., resistive, capacitive, etc.) may be overlaid on display 312 to form a touch sensitive display for communicating touch gesture (e.g., finger or stylus) input to processor(s) 304.

An input device 314, including alphanumeric and other keys, may be coupled to bus 302 for communicating information and command selections to processor 304. In addition to or instead of alphanumeric and other keys, input device 314 may include one or more physical buttons or switches such as, for example, a power (on/off) button, a "home" button, volume control buttons, or the like.

Another type of user input device may be a cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

While in some configurations, such as the configuration depicted in FIG. 3, one or more of display 312, input device 314, and cursor control 316 are external components (i.e., peripheral devices) of computing device 300, some or all of display 312, input device 314, and cursor control 316 are integrated as part of the form factor of computing device 300 in other configurations.

Functions of the disclosed systems, methods, and modules may be performed by computing device 300 in response to processor(s) 304 executing one or more programs of software instructions contained in main memory 306. Such software instructions may be read into main memory 306 from another storage medium, such as storage device(s) 310. Execution of the software instructions contained in main memory 306 cause processor(s) 304 to perform the functions of the example embodiment(s).

While functions and operations of the example embodiment(s) may be implemented entirely with software instructions, hard-wired or programmable circuitry of computing device 300 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more software instructions to processor(s) 304 for execution. For example, the software instructions may initially be carried on a magnetic disk or solid-state drive of a remote computer. The remote computer can load the software instructions into its dynamic memory and send the software instructions over a telephone line using a modem. A modem local to computing device 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor(s) 304 retrieves and executes the software instructions. The software instructions received by main memory 306 may optionally be stored on storage device(s) 310 either before or after execution by processor(s) 304.

Computing device 300 also may include one or more communication interface(s) 318 coupled to bus 302. A communication interface 318 provides a two-way data communication coupling to a wired or wireless network link 320 that is connected to a local network 322 (e.g., Ethernet network, Wireless Local Area Network, cellular phone network, Bluetooth wireless network, or the like). Communication interface 318 sends and receives electrical, electromagnetic, or optical signals that carry digital data streams representing various types of information. For example, communication interface 318 may be a wired network interface card, a wireless network interface card with an integrated radio antenna, or a modem (e.g., ISDN, DSL, or cable modem).

Network link(s) 320 typically provide data communication through one or more networks to other data devices. For example, a network link 320 may provide a connection through a local network 322 to a host computer 324 or to data equipment operated by an Internet Service Provider (ISP) 326. ISP 326 in turn provides data communication services through the world wide packet data communication network now commonly referred to as the "Internet" 328. Local network(s) 322 and Internet 328 use electrical, electromagnetic or optical signals that carry digital data streams. The signals through the various networks and the signals on network link(s) 320 and through communication interface(s) 318, which carry the digital data to and from computing device 300, are example forms of transmission media.

Computing device 300 can send messages and receive data, including program code, through the network(s), network link(s) 320 and communication interface(s) 318. In the Internet example, a server 330 might transmit a requested code for an application program through Internet 328, ISP 326, local network(s) 322 and communication interface(s) 318.

The received code may be executed by processor 304 as it is received, and/or stored in storage device 310, or other non-volatile storage for later execution.

5.0 IMPLEMENTATION MECHANISMS—SOFTWARE OVERVIEW

Figure 4:
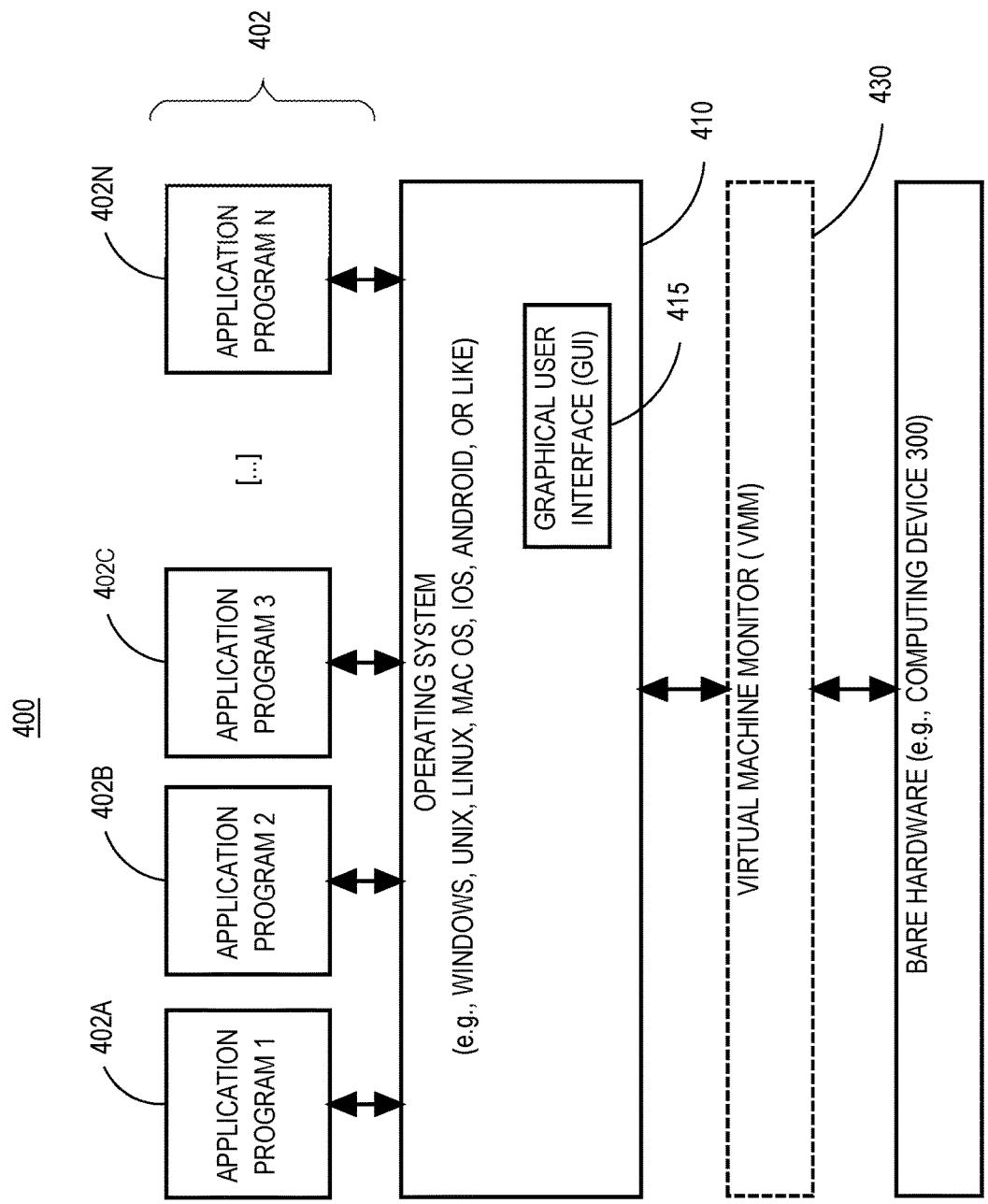
FIG. 4 is a block diagram of a software system for controlling the operation of the computing device.

FIG. 4 is a block diagram of a software system 400 that may be employed for controlling the operation of computing device 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing device 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on device 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of device 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the device 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of device 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A computer-implemented data processing method, comprising:
    storing, by a processor, an electronic configuration document that identifies one or more configurations of users, groups, and/or permissions relating to access to computer program artifacts in a first repository of an artifact repository system that is geographically distributed,
    the users and groups including external user groups who do not have explicit user-based permissions to view contents of a repository of the artifact repository system,
    the artifact repository system comprising one or more second repositories that respectively replicate one or more third repositories and respectively have associated sets of properties, the one or more third repositories including a repository external to the artifact repository system and associated with an external user group of the external user groups,
    the one or more configurations identified in the electronic configuration document comprising at least one configuration for configuring external visibility of computer program artifacts in the artifact repository system for one or more external user groups;
    deriving, by the processor, from the electronic configuration document, a plurality of regional repository settings values for users, groups, and/or permissions relating to access to the computer program artifacts for each second repository of the one or more second repositories based on the associated set of properties.

2. The computer-implemented method of claim 1, further comprising transmitting each plurality of regional repository settings values derived from the electronic configuration document and causing injection of the plurality of regional repository settings values into a corresponding second repository of the one or more second repositories.

3. The computer-implemented method of claim 1, wherein the one or more configurations of users, groups, and/or permissions relating to access to computer program artifacts comprises one or more configurations for creating, update, or deleting users or groups.

4. The computer-implemented method of claim 1, wherein the one or more configurations of users, groups, and/or permissions relating to access to computer program artifacts comprises one or more configurations for configuring settings for a remote repository that is a replicated mirror of the first repository.

5. The computer-implemented method of claim 1, further comprising marshaling a plurality of partial configuration files into the electronic configuration document.

6. The computer-implemented method of claim 1, wherein the electronic configuration document symbolically identifies the one or more configurations by including markup code written in a programming source code language, a human-readable symbolic language, or a natural language.

7. The computer-implemented method of claim 6, further comprising transforming the markup code into specific permissions, credentials, or other commands or parameter values for configuring a second repository of the one or more second repositories.

8. The computer-implemented method of claim 1, the associated sets of properties indicate whether a second repository is a remote repository of another local repository, whether a second repository is a remote repository of an external repository, users or groups with access to a second repository, types of permissions to access artifacts in a second repository for the users or groups, or paths in a second repository that are visible or not visible to the users and groups.

9. The computer-implemented method of claim 1, further comprising:
    detecting a change to the electronic configuration document based on a pull request submitted to the first repository,
    the deriving being in response to the detecting.

10. The computer-implemented method of claim 1,
    the artifact repository system managing a plurality of regional clusters,
    a third repository of the one or more third repositories being replicated in each regional cluster of the plurality of regional clusters,
    the deriving comprising obtaining a specific plurality of regional repository settings values for one regional cluster and propagating the specific plurality of regional repository setting values to all other regional clusters of the plurality of regional clusters.

11. One or more non-transitory, computer-readable storage media storing instructions which when executed cause one or more processors to perform a data processing method, the method comprising:
    storing an electronic configuration document that identifies one or more configurations of users, groups, and/or permissions relating to access to computer program artifacts in a first repository of an artifact repository system that is geographically distributed,
    the users and groups including external user groups who do not have explicit user-based permissions to view contents of a repository of the artifact repository system,
    the artifact repository system comprising one or more second repositories that respectively replicate one or more third repositories and respectively have associated sets of properties, the one or more third repositories including a repository external to the artifact repository system and associated with an external user group of the external user groups,
    the one or more configurations identified in the electronic configuration document comprising at least one configuration for configuring external visibility of computer program artifacts in the artifact repository system for one or more external user groups;
    deriving from the electronic configuration document, a plurality of regional repository settings values for users, groups, and/or permissions relating to access to the computer program artifacts for each second repository of the one or more second repositories based on the associated set of properties.

12. The one or more non-transitory, computer-readable storage media of claim 11, the method further comprising transmitting each plurality of regional repository settings values derived from the electronic configuration document and causing injection of the plurality of regional repository settings values into a corresponding second repository of the one or more second repositories.

13. The one or more non-transitory, computer-readable storage media of claim 11, wherein the one or more configurations of users, groups, and/or permissions relating to access to computer program artifacts comprises one or more configurations for creating, update, or deleting users or groups.

14. The one or more non-transitory, computer-readable storage media of claim 11, wherein the one or more configurations of users, groups, and/or permissions relating to access to computer program artifacts comprises one or more configurations for configuring settings for a remote repository that is a replicated mirror of the first repository.

15. The one or more non-transitory, computer-readable storage media of claim 11, the method further comprising marshaling a plurality of partial configuration files into the electronic configuration document.

16. The one or more non-transitory, computer-readable storage media of claim 11, wherein the electronic configuration document symbolically identifies the one or more configurations by including markup code written in a programming source code language, a human-readable symbolic language, or a natural language.

17. The one or more non-transitory, computer-readable storage media of claim 16, the method further comprising transforming the markup code into specific permissions, credentials, or other commands or parameter values for configuring a second repository of the one or more second repositories.

18. The one or more non-transitory, computer-readable storage media of claim 11, the associated sets of properties indicate whether a second repository is a remote repository of another local repository, whether a second repository is a remote repository of an external repository, users or groups with access to a second repository, types of permissions to access artifacts in a second repository for the users or groups, or paths in a second repository that are visible or not visible to the users and groups.

19. The one or more non-transitory, computer-readable storage media of claim 11, the method further comprising:
    detecting a change to the electronic configuration document based on a pull request submitted to the first repository,
    the deriving being in response to the detecting.

20. The one or more non-transitory, computer-readable storage media of claim 11,
    the artifact repository system managing a plurality of regional clusters,
    a third repository of the one or more third repositories being replicated in each regional cluster of the plurality of regional clusters,
    the deriving comprising obtaining a specific plurality of regional repository settings values for one regional cluster and propagating the specific plurality of regional repository setting values to all other regional clusters of the plurality of regional clusters.

\* \* \* \* \*